United States Patent
Xu et al.

(10) Patent No.: US 10,313,738 B2
(45) Date of Patent: Jun. 4, 2019

(54) DYNAMIC TIME WINDOW AND CACHE MECHANISM UNDER THE HETEROGENEOUS NETWORK TRANSMISSION

(71) Applicant: SHANGHAI JIAO TONG UNIVERSITY, Shanghai (CN)

(72) Inventors: Yiling Xu, Shanghai (CN); Wenjun Zhang, Shanghai (CN); Chengzhi Wang, Shanghai (CN); Jun Sun, Shanghai (CN); Yunfeng Guan, Shanghai (CN); Dazhi He, Shanghai (CN); Ning Liu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 15/549,163

(22) PCT Filed: Feb. 2, 2016

(86) PCT No.: PCT/CN2016/073168
§ 371 (c)(1),
(2) Date: Dec. 18, 2017

(87) PCT Pub. No.: WO2016/124130
PCT Pub. Date: Aug. 11, 2016

(65) Prior Publication Data
US 2018/0262799 A1    Sep. 13, 2018

(30) Foreign Application Priority Data

Feb. 6, 2015 (CN) .......................... 2015 1 0064427
Jun. 18, 2015 (CN) .......................... 2015 1 0341265
(Continued)

(51) Int. Cl.
H04N 21/43       (2011.01)
H04N 21/433      (2011.01)
(Continued)

(52) U.S. Cl.
CPC ......... *H04N 21/4331* (2013.01); *H04L 67/28* (2013.01); *H04N 21/235* (2013.01);
(Continued)

(58) Field of Classification Search
None
See application file for complete search history.

(56) References Cited

FOREIGN PATENT DOCUMENTS

WO    WO-2014120377 A1 *  8/2014  ......... H04N 21/4305

* cited by examiner

*Primary Examiner* — Cai Y Chen

(57) ABSTRACT

A dynamic time window and cache method under the heterogeneous network transmission is provided, including adding Available_Time and Asset_Size attributes of the media content in the signaling or other places for the existing signaling at a MMT, so that the client terminal gets the time when the corresponding media content is available and the size of the media content; at the same time determining the network bandwidth and the network delay of the content from the broadband to the client under the current broadband network by the client; wherein the client terminal calculates the time interval for transmitting a request for caching in advance and the size of a cache window required by the terminal through the available time of the content of a broadband source and the delay of a broadband channel.

3 Claims, 6 Drawing Sheets

(30) Foreign Application Priority Data

Oct. 10, 2015 (CN) .......................... 2015 1 0654384
Oct. 23, 2015 (CN) .......................... 2015 1 0698388

(51) Int. Cl.
*H04W 4/06* (2009.01)
*H04N 21/437* (2011.01)
*H04N 21/462* (2011.01)
*H04N 21/647* (2011.01)
*H04N 21/235* (2011.01)
*H04N 21/2362* (2011.01)
*H04N 21/434* (2011.01)
*H04N 21/435* (2011.01)
*H04L 29/08* (2006.01)
*H04N 21/643* (2011.01)
*H04N 21/61* (2011.01)

(52) U.S. Cl.
CPC ....... *H04N 21/2362* (2013.01); *H04N 21/435* (2013.01); *H04N 21/437* (2013.01); *H04N 21/4307* (2013.01); *H04N 21/4345* (2013.01); *H04N 21/4622* (2013.01); *H04N 21/64738* (2013.01); *H04W 4/06* (2013.01); *H04N 21/6112* (2013.01); *H04N 21/6125* (2013.01); *H04N 21/64322* (2013.01)

DYNAMIC TIME WINDOW AND CACHE MECHANISM UNDER THE HETEROGENEOUS NETWORK TRANSMISSION

CROSS REFERENCE OF RELATED APPLICATION

This is a U.S. National Stage under 35 U.S.C 371 of the International Application PCT/CN2016/073168, filed Feb. 2, 2016, which claims priority under 35 U.S.C. 19(a-d) to CN 201510064427.2, filed Feb. 6, 2015; CN 201510341265.2, filed Jun. 18, 2015; CN 201510654384.3, filed Oct. 10, 2015; and CN 201510698388.1, filed Oct. 23, 2015.

BACKGROUND OF THE PRESENT INVENTION

Field of Invention

The present invention relates to a dynamic time request window and cache mechanism for the client terminal under the heterogeneous network transmission, and more particularly to a method for determining the time interval in which the terminal requests to transmit the media content and the size of a cache window.

Description of Related Arts

With the change of the times, people are not satisfied with relying only on traditional television to get information and entertain. More terminal equipment appears in front of us, such as PCs connected to the Internet, mobile phones that almost everyone has one and more and more popular mobile tablets. These new products have been slowly eroding the traditional television business market. With the development of mobile communication and broadband wireless technology and the increasing maturity of multimedia services, the integration has become the development trend of the information communication industry. It allows users to easily access the network and easily enjoy the rich media content and diversified service.

Meanwhile, the media content will not only be simply presented in video, audio and subtitle and the media type will become increasingly rich and varied. The media source is not just a specific content provider, and there are more and more producers involved in it, including many individual users who are also content providers and producers. There are various association relationships among these contents from different providers. To meet the individualized needs of different users, these associated contents often need to be presented simultaneously. In this environment, the heterogeneous network convergence is an inevitable development trend of the next generation network, which fully illustrates that the future communication is no longer a specific access technology, but multiple access technologies coexist and work together.

In the heterogeneous network environment consisting of the broadcast and the broadband, the media content presented by the terminal can be transmitted from both the broadcast channel and the broadband channel simultaneously. For the presentation of the heterogeneous network terminal, there is a multi-source content distribution mechanism based on the presentation information (CI, Composition Information). HTML5 and XML technologies are used for CI to provide the time and space information of the media data, so that the multimedia data can be presented in diversified ways on the terminal.

The terminal can request the relevant content from the server based on the information in the signaling; but when the server receives the request, the relevant content may be ready or may be not ready. If the relevant content is not ready, the request of the terminal will fail, and then the terminal makes a request again until the relevant content is obtained. This is a great burden on the terminal and also increases the network burden.

As the current broadband network needs to forward the content on a number of nodes, so there is a large network delay problem and even a network congestion problem. Therefore, it is necessary to cache the content in advance at the receiver to deal with the problem that the content on the terminal cannot be played or the media content cannot be played synchronously.

The introduction of the caching brings new problems, such as how much content the terminal needs to cache in advance and when to start to cache the content. These problems will affect the client device configuration and the system performance. Therefore, the size of the cache window on the client and the time of pulling the cache have become an urgent problem to be solved.

Meanwhile, if the server is too late to provide the media content, the end user cannot get the relevant resources in time; therefore, under the specific network media services, whether the server is necessary to notify the terminal of the time when the media content is ready and when to notify have also become a problem to be solved.

SUMMARY OF THE PRESENT INVENTION

In view of the defects in the prior art, the invention provides a method for adaptively adjusting the request time window and the size of the cache window on the heterogeneous network terminal, thus solving the problem that the content of the heterogeneous terminal in the broadcast and the broadband cannot be synchronized due to the broadband congestion, and also reducing the extra expenditure of the client due to the caching.

According to a first object of the invention, to solve the problem that media-related resources cannot be played synchronously due to the network congestion in the heterogeneous media network transmission, the invention provides a dynamic time window and cache mechanism under the heterogeneous network transmission, wherein Available_Time and Asset_Size attributes of the media content are added in the signaling part for the existing signaling at a MMT, so that the client terminal gets the time when the corresponding media content is available; at the same time, the client terminal determines the network bandwidth and the network delay of the content from the broadband to the client under the current broadband network through the corresponding method in the network; the client terminal calculates the time interval for transmitting a request for caching in advance and the size of a cache window required by the terminal through the available time of the content of a broadband source and the delay of a broadband channel.

According to a second object of the invention, the invention provides a resource dynamic request method under the heterogeneous media transmission network, to implement a mechanism for the server to transmit the signaling of the media resource and the terminal to dynamically request the time window of the media resource under the heterogeneous media network transmission.

The resource dynamic request method under the heterogeneous media transmission network is specifically as follows: Available_Time of the media content is added in the MPT table, CI file and MPU signaling part for the existing signaling at a MMT, so that the client terminal gets the time when the corresponding media content is available; at the same time, the client terminal determines the network bandwidth and the network uplink and downlink delay under the current network, and the client terminal calculates the time interval for transmitting a request for caching in advance in the case of different servers through the available time of the content of a source and the delay; according to the method, the available time information Available_Time of the asset is added in the reserved field of MMT_general_location_info( ) of the signaling MPT, and the method of calculating the Available_Time time window is given for the server which has different methods for processing the resource request message currently.

According to a third object of the invention, to solve the problem that the available time of the resource is dynamically added in a new generation of heterogeneous media network transmission system, the invention provides a method for dynamically providing the available time of the resource under the heterogeneous media network transmission, wherein the available time attribute of the media resource is added in the signaling. CI or MPU for the existing signaling at a MMT, so that the client gets the available time of the corresponding media resource; the available time attribute of the media resource is added so that the client gets the available time of the corresponding media resource by any one of the following two methods:

Method 1: A new descriptor AT descriptor is added in the signaling and the descriptor is used to describe the available time of the media resource;

Method 2: The available time attribute of the media resource is added in the signaling MPT; the client terminal requests the media resource in advance in the corresponding interval through the available time of the media resource in the signaling.

Further, the method for dynamically providing the available time of the resource under the heterogeneous media network transmission is as follows: the reserved field is taken in the signaling as available_time_flag, to notify the client whether the available time of the current media resource is given.

Compared with the prior art, the invention has the following beneficial effects:

According to the invention, new attributes are added in the signaling or other places for the existing signaling at a MMT, so that the client terminal determines the network bandwidth and the one-way network delay of the content from the broadband to the client under the current broadband network through the corresponding method in the broadband network, to solve the problem that the media content is difficult to be synchronized due to the network congestion in the broadband, thus solving the synchronization problem due to the IP network congestion; further, the invention solves the problem that the media content cannot be presented on time or cannot be presented synchronously due to the large network delay under the heterogeneous media network transmission; further, the invention realizes that the server sends the signaling of the media resource to notify the terminal of the available time of the media network under the heterogeneous media network transmission, to solve the problem that a request cannot be made in time due to the unknown available time of the media resource in the heterogeneous media network transmission.

These and other objectives, features, and advantages of the present invention will become apparent from the following detailed description, the accompanying drawings, and the appended claims.

BRIEF DESCRIPTION OF THE DRAWINGS

Other features, objects, and advantages of the invention will become more apparent from reading the description of non-limiting embodiments detailed with reference to the following figures.

DETAILED DESCRIPTION OF THE PREFERRED EMBODIMENT

Figure 1:
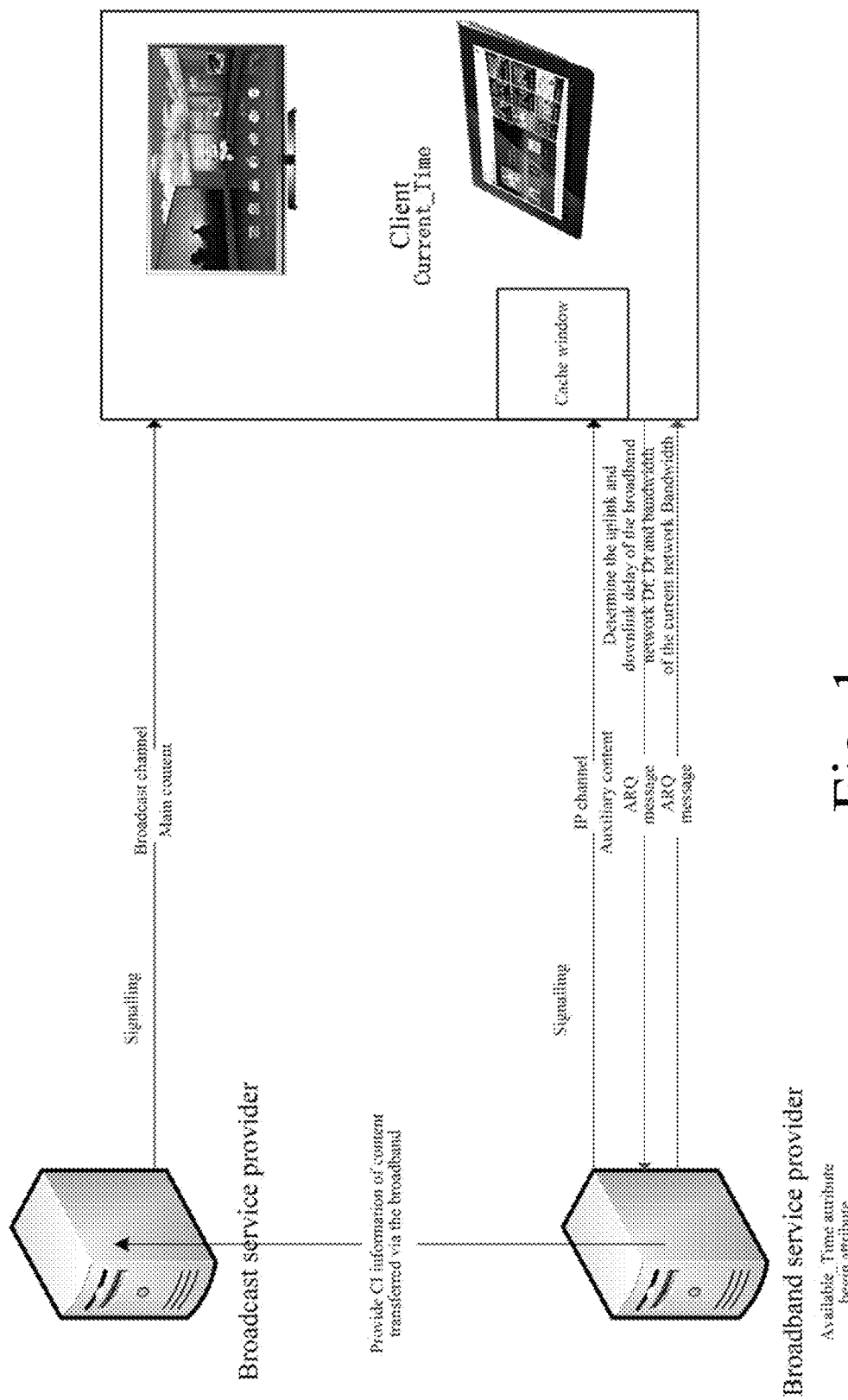
FIG. 1 is a schematic diagram of a heterogeneous network model.

The invention is described in detail as follows with reference to specific embodiments. The following embodiments will help provide further understanding of the invention for those skilled in the art, and not in any way limit the invention. It shall be noted that several variants and improvements can be made without departing from concept of the invention for ordinary persons skilled in the art. All these fall within the protection scope of the invention.

Today, the diversified terminal presentation based on the heterogeneous network has become a trend of development. While watching high-quality broadcast video programs, people' demands for the diversified network media service have become increasingly high. In the heterogeneous system consisting of the broadcast and the broadband network, CI is used to control the time and space layout of the client to play the broadcast and broadband contents, to achieve the synchronization of the media content. In general, the media content from the broadcast channel has a small and fixed delay, so there is no impact on the synchronization; the media content from the broadband such as audio, video, subtitle and multimedia application is more affected by the current IP network, resulting in large and jitter delay and causing problems for the content synchronization; meanwhile, the content from the broadband has a problem of the effective access period, that is, the content can be accessed from a certain time and is valid before a certain time. The invention thus provides the effective time information of the content and designs a mechanism for requesting the transmission of the information in advance on the terminal and allocating the cache window for the corresponding content.

Embodiment 1

The embodiment can solve the problem that the content of the heterogeneous terminal in the broadcast and the broadband cannot be synchronized due to the broadband congestion, and can also reduce the extra expenditure of the client due to the caching. In the embodiment, the time window information is added in the presentation information (CI) file or in the media packaging unit (MPU), or available_time_info( ) is added in the MPT, to describe the time window information; meanwhile, the method of dynamically making a request and caching the media resource is given after the time window information is given.

A new attribute of Available_Time is added for each part of the content in the original signaling or other places, to illustrate the time at which the content to be transferred in the broadband is ready at the content provider and can be transferred and the access end time. It is assigned based on the following rules:

1) Time is unknown

If the server cannot determine the time at which the content to be transferred is ready, Available_Time is assigned to "unknown"; to consider the system compatibility, if the Available_Time attribute is not added in the signaling sent by the server, Available_Time is parsed as unknown by the terminal.

2) It can be accessed at any time

If the media content of the server can be accessed and sent at any time, Available_Time is assigned to "anytime".

3) It is always valid after a certain time

If the content of the server is always valid after a certain time, Available_Time is assigned to the specific UTC time, i.e., "UTC1".

4) It is valid within a specific time interval

If the content of the server is available within a specific time interval, Available_Time is assigned to the time interval, i.e., "UTC1-UTC2" and UTC in the bracket.

The parsing of Available_Time is completed at the terminal.

Also, the Asset_Size attribute can be added for each part of the content in the signaling or other places as needed to indicate the size of the part of the content.

The newly added Available_Time and Asset_Size attributes can be added in different places as needed in the specific locations of the system. Such as CI, MPT and MPU. These locations are taken as examples to give an introduction as follows.

The examples of adding Available_Time and Asset_Size attributes in the CI, MPT and MPU are as follows: 1) A new attribute is added in the CI If the mediaSrc attribute is in the MediaSync element, the newly added Available_Time and Asset_Size attributes are also placed in the element as follows:

```
<mmtci:CI>
    <mmtci:view id="View1" mmtci:viewRole="default" style=
"position:absolute; width:1920px; height:1080px">
        <mmtci:divLocation id="divL1" style="position:absolute;
width:100%; height:100%; left:0px; top:0px" mmtci:refDiv="Area1"/>
    </mmtci:view>
    <mmtci:MediaSync refId="video1" mmtci:begin=
"2015-01-31T15:20:00+08:00" mmtci:end="2015-01-31T15:20:30+08:00"
mmtci:mediaSrc="mmt://224.1.1.1/Video1/Video1_1.mp4?
sequence_num=0-193&type=video" mmtci:Available_Time=
"2015-01-31T15:10:00+08:00--2015-01-31T15:15:00+08:00" mmtci:
Asset_Size="5Mb"/>
</mmtci:CI >
```

If the mediaSrc attribute is in the sourceList subelement of the MediaSync element, the newly added Available_Time and Asset_Size attributes are placed in the corresponding sourceList as follows:

```
<mmtci:CI>
    <mmtci:view id="View1" mmtci:viewRole="default" style=
"position:absolute; width:1920px; height:1080px">
        <mmtci:divLocation id="divL1" style="position:absolute;
width:100%; height:100%; left:0px; top:0px" mmtci:refDiv="Area1"/>
    </mmtci:view>
    <mmtci:MediaSync refId="video1" mmtci:begin="2015-01-
31T15:20:00+08:00"
mmtci:end="2015-01-31T15:20:30+08:00"/>
    <mmtci:sourceList
mmtci:mediaSrc="mmt://224.1.1.1/Video1/Video1_1.mp4?
sequence_num=0-193&type=audio" mmtci:Available_Time=
"2015-01-31T15:10:00+08:00--2015-01-31T15:15:00+
08:00" mmtci:Asset_Size="512Kb"/>
    <mmtci:sourceList
mmtci:mediaSrc="mmt://224.1.1.1/Video2/Video1_2.mp4?
sequence_num=0-193&type=audio" mmtci:Available_Time=
"anytime" mmtci:Asset_Size="1Mb"/>
</mmtci:CI >
```

2) A new attribute is added in the MPT

Asset_Size can be added for each asset in the MPT table to describe the size.

If the content has multiple source addresses, one Available_Time is assigned to the part of the content in each source address; if the content has only one source address, one Available_Time is assigned only to the source content of the address. There are a number of specific implementation modes and two examples are given below.

A. Available_Time_Type and MMT_Available_Time_info( ) are added in the MPT.

By taking four cases as examples, we can allocate two bits to

Available_Time_Type to represent four cases of Available_Time. If there is more available time classification, more bits can be allocated.

MMT_Available_Time_info( ) illustrates the available time or available time interval information of the media content. MPT is as follows:

| MP table Syntax | | | |
|---|---|---|---|
| Syntax | Value | No. of bits | Mnemonic |
| MP_table( ) { | | | |
|   table_id | | 8 | uimsbf |
|   version | | 8 | uimsbf |
|   length | | 16 | uimsbf |
|   reserved | | 6 | bslbf |
|   MP_table_mode | | 2 | bslbf |
|   If (table_id == SUBSET_0_MPT_TABLE_ID) { | | | |
|     MMT_package_id { | | | |
|       MMT_package_id_length | | 8 | uimsbf |
|       for (i=0; i<N1; i++) { | | | |
|         MMT_package_id_byte | | 8 | uimsbf |
|       } | | | |
|     } | | | |
|   } | | | |
|   MP_table_descriptors { | | | |
|     MP_table_descriptors_length | | 16 | uimsbf |
|     for (i=0; i<N2; i++) { | | | |
|       MP_ table_descriptors byte | | 8 | uimsbf |
|     } | | | |
|   } | | | |
| } | | | |
| number_of_assets | | 8 | uimsbf |
| for (i=0; i<N3; i++) { | | | |
|   Identifier_mapping( ) | | | |
|   asset_type | | 32 | char |
|   asset_size | | 64 | uimsbf |
|   reserved | | 7 | bslbf |
|   asset_clock_relation_flag | | 1 | bslbf |

| MP table Syntax | | | |
|---|---|---|---|
| Syntax | Value | No. of bits | Mnemonic |
| if (asset_clock_relation_flag = 1) { | | | |
|   asset_clock_relation_id | | 8 | uimsbf |
|   reserved | | 7 | bslbf |
|   asset_timescale_flag | | 1 | bslbf |
|   if (asset_time_scale_flag == 1) { | | | |
|     asset_timescale | | 32 | uimsbf |
|   } | | | |
| } | | | |
| asset_location { | | | |
|   location_count | | 8 | uimsbf |
|   for (i=0; i<N6; i++) { | | | |
|     MMT_general_location_info( ) | | | |
|     Available_Time_Type | | 2 | uimsbf |
|     MMT_Available_Time_info( ) | | | |
|   } | | | |
| } | | | |
| asset_descriptors ( | | | |
|   asset_descriptors_length | | 16 | uimsbf |
|   for (j=0; j<N5; j++) { | | | |
|     asset_descriptors_byte | | 8 | uimsbf |
|   } | | | |
| } | | | |
| } | | | |

| MMT_Available_Time_info Syntax | | | |
|---|---|---|---|
| Syntax | Value | No. of bits | Mnemonic |
| MMT_Available_Time_info( ) { | | | |
|   if (Available_Time_Type == 10) { | | | |
|     available_begin | | 64 | uimsbf |
|   } else if (location_type == 11) { | | | |
|     available_begin | | 64 | uimsbf |
|     availbel_end | | 64 | uimsbf |
|   } | | | |
| } | | | |

Available_Time_Type: These two bits indicate the type of available time as follows:

| Value of Available_Time_Type | |
|---|---|
| Value | Description |
| 0x00 | The available time is unknown and there is no need to enter MMT_Available_Time_info( ) |
| 0x01 | The part of the content is always available and there is no need to enter MMT_Available_Time_info( ) |
| 0x02 | The part of the content is always available from a certain time and the time is defined in MMT_Available_Time_info( ) |
| 0x03 | The part of the content is always available within a time period and the begin time and end time of the time period are defined in MMT_Available_Time_info( ) |

B. MMT_Available_Time_info( ) is only added in the MPT and MMT_Available_Time_info( ) illustrates the available time or available time interval information of the media content. MPT is as follows:

| MP table Syntax | | | |
|---|---|---|---|
| Syntax | Value | No. of bits | Mnemonic |
| MP_table( ) { | | | |
|   table_id | | 8 | uimsbf |
|   version | | 8 | uimsbf |
|   length | | 16 | uimsbf |
|   reserved | | 6 | bslbf |
|   MP_table_mode | | 2 | bslbf |
|   If (table_id == SUBSET_0_MPT_TABLE_ID) { | | | |
|     MMT_package_id { | | | |
|       MMT_package_id_length | | 8 | uimsbf |
|       for (i=0; i<N1; i++) { | | | |
|         MMT_package_id_byte | | 8 | uimsbf |
|       } | | | |
|     } | | | |
|   } | | | |
|   MP_table_descriptors { | | | |
|     MP_table_descriptors_length | | 16 | uimsbf |
|     for (i=0; i<N2; i++) { | | | |
|       MP_table_descriptors_byte | | 8 | uimsbf |
|     } | | | |
|   } | | | |
|   number_of_assets | | 8 | uimsbf |
|   for (i=0; i<N3; i++) { | | | |
|     Identer_mapping( ) | | | |
|     asset_type | | 32 | char |
|     asset_size | | 64 | uimsbf |
|     reserved | | 7 | bslbf |
|     asset_clock_relation_flag | | 1 | bslbf |
|     if (asset_clock_relation_flag ==1) { | | | |
|       asset_clock relation_id | | 8 | uimsbf |
|       reserved | | 7 | bslbf |
|       asset_timescale_flag | | 1 | bslbf |
|       if (asset_time_scale_flag ==1) { | | | |
|         asset_timescale | | 32 | uimsbf |
|       } | | | |
|     } | | | |
|     asset_location { | | | |
|       location_count | | 8 | uimsbf |
|       for (i=0; i<N6; i++) { | | | |
|         MMT_general_location_info( ) | | | |
|         MMT_Available_Time_info( ) | | | |
|       } | | | |
|     } | | | |
|     asset_descriptors { | | | |
|       asset_descriptors_length | | 16 | uimsbf |
|       for (j=0; j<N5; j++) { | | | |
|         asset_descriptors_byte | | 8 | uimsbf |
|       } | | | |
|     } | | | |
|   } | | | |
| } | | | |

| MMT_Available_Time_info Syntax | | | |
|---|---|---|---|
| Syntax | Value | No. of bits | Mnemonic |
| MMT_Available_Time_info( ) { | | | |
|   available_begin | | 64 | uimsbf |
|   available_end | | 64 | uimsbf |
| } | | | | available_begin and available_end are used as follows

| available_begin | available_end | Description |
|---|---|---|
| All set to 0 | All set to 0 | The available time is unknown |
| All set to 1 | All set to 1 | The part of the content is always available |
| Specific UTC time | All set to 1 | The part of the content is always available after availble_begin time |

-continued

| available_begin | available_end | Description |
|---|---|---|
| Specific UTC time | Specific UTC time | The part of the content is available between two time |

3) A new attribute is added in the MPU

The size of a single MPU is described in the MPU, so mpu_size is taken here

| Syntax | No. of bits | Mnemonic |
|---|---|---|
| MPU_timestamp_descriptor ( ) { | | |
|   descriptor_tag | 16 | uimsbf |
|   descriptor_length | 8 | uimsbf |
|   for (i=0; i<N; i++) { | | |
|     mpu_sequence_number | 32 | uimsbf |
|     mpu_presentation_time | 64 | uimsbf |
|     mpu_size | 32 | uimsbf |
|     mpu_available_time | 64 | uimsbf |
|   } | | |
| } | | |

The cache mechanism for dynamically allocating the size of the cache window is designed based on the following ideas: the existing attributes in the CI file include the time at which the object normally begins to present—begin, and meanwhile the current one-way broadband network delay—$t_1$ and the broadband network bandwidth—Bandwidth can be got through the corresponding method in the IP network, for example by sending the ICMP message segment. After Available_Time and Asset_Size attributes of available time of the broadband content are added in the signaling or other places, a threshold—Threshold is set; if the delay $t_1$ is less than the Threshold, the delay is ignored and there is no need to allocate extra cache for the media content transferred by the broadband in the system; if $t_1$ is more than the Threshold, the time interval in which the media content in the broadband is requested to be sent in advance can be determined through the method in the specific solution and a cache window is assigned to the terminal. If the network delay is large and Available_Time provided by the content provider does not meet the condition that the advanced caching is kept in synchronization, the auxiliary content transferred via the broadband channel is discarded directly.

The specific solution is as follows (the following steps can be selected and combined according to the actual situation):
1) Available_Time and Asset_Size attributes of the corresponding content are added in the signaling or other places;
2) The client terminal gets the one-way delay of the current broadband network t1 and the bandwidth of the broadband network Bandwidth through the corresponding method in the IP network, for example by sending the ICMP message segment;
3) The client obtains the available time (Available_Time) of the corresponding media content, normal play time (begin) and the size of the corresponding content (Asset_Size) by parsing the signaling (such as MPT and CI);
4) If $t_1$<Threshold, the delay is ignored; if $t_1$>Threshold, the time window for the terminal to send a request and the size of cache assigned by the terminal are calculated by the following method:
  ① The time required for the service provider to transfer a content unit Data_Transfer_Time can be calculated based on the size of a content unit and the bit rate in the current broadband environment;
  ② If Available_Time is "unknown" or there is no such attribute in CI, no processing is performed; if Available_Time is "anytime", it is required to skip this step and go to ③ if Available_Time is a specific UTC time interval, the following judgment is made based on the earliest time:

$$\text{Available\_Time} + t1 + \text{Data\_Transfer\_Time} < \text{begin} \quad (1)$$

If condition (1) is not met, it indicates that the available time of the media content to be transferred is too late and the media content cannot reach the terminal in time under the current network delay, so the part of the content is required to be discarded; if condition (1) is met, it indicates that the asynchronization problem caused by the current network delay can be resolved through the advanced caching and the calculation in the next step is required;
  ③ The time interval in which the media content is requested by the terminal to be sent in advance is calculated:

Earliest request time:

$$\text{Earliest\_Request\_Time} = \text{Available\_Time} - t1 \quad (2)$$

Latest request time:

$$\text{Latest\_Request\_Time} = \text{begin} - 2t1 - \text{Data\_Transfer\_Time} \quad (3)$$

The actual request time is between these two times:

$$\text{Earliest\_Request\_Time} < \text{Actual\_Request\_Time} < \text{Latest\_Request\_Time} \quad (4)$$

④ After a request time is selected, the time at which the terminal can begin to receive the data of the service provider is:

$$\text{Receive\_Time} = \text{Actual\_Request\_Time} + 2t1 \quad (5)$$

The time to receive the data before the time from the terminal to begin is:

$$\Delta t = \text{begin} - \text{Receive\_Time} \quad (6)$$

⑤ If Asset_Size attribute is given in CI, the size of the cache window assigned by the terminal is:

$$\text{Buffer\_Size} = \min\{\Delta t * \text{bitrate}, \text{Asset\_Size}\} \quad (7)$$

If Asset_Size attribute is not given in CI, the size of the cache window assigned by the terminal is:

$$\text{Buffer\_Size} = \Delta t * \text{bitrate} \quad (8)$$

The variables used in the solution and their meanings are summarized in the following table:

| Variable | Meaning and purpose |
|---|---|
| begin | Time at which the client normally plays the specific content |
| Available_Time | Time at which the content to be transferred is ready at the content provider and can be transferred |
| Asset_Size | Size of media content |
| t1 | One-way network delay in the broadband channel |
| Bandwidth | Bandwidth of broadband network |
| Threshold | To determine whether the current delay will affect the synchronization of main and auxiliary videos |
| Earliest_Request_Time | Earliest request time of the terminal |
| Latest_Request_Time | Latest request time of the terminal |
| Actual_Request_Time | Actual request time of the terminal |
| Receive_Time | Time at which the terminal begins to receive data |
| Buffer_Size | Size of the cache window assigned by the terminal |

An example is given below:

It is known that the current state of the system is as follows when the client receives the corresponding signaling. Here, Threshold is set to 0.1 s, and Data_Transfer_Time is generally based on the current data size and bit rate and 3 s is taken here.

| Parameter | Value |
|---|---|
| t1 | 10 s |
| Bandwidth | 10 Mbps |
| Threshold | 0.1 s |

An image and audio file information contained in the signaling are as follows:

| File | begin | Available_Time | Asset_Size |
|---|---|---|---|
| Image. 1 | 2015-01-31T5:00:00+08:00 | 2015-01-31T4:59:50+08:00 | 512 Kb |
| Audio. 1 | 2015-01-31T5:00:00+08:00 | 2015-01-31T4:59:20+08:00--2015-01-31T4:59:50+08:00 | 2 Mb |

The current network delay is 10 s that is much larger than the Threshold of 0.1 s, it indicates that the broadband delay of 10 s is unacceptable and it is required to request to transfer the content in advance.

For Image. 1, the available time is all of the time after 4:59:50 (Beijing time), but the available time is too late and does not meet the condition (1), that is, the content is transferred to the terminal when it cannot be played, so the content is discarded.

For Audio. 1, the available time is between 4:59:20 and 4:59:50 (Beijing time) and 4:59:20 meets the condition (1), so the time interval in which the request is sent can be obtained by equations (2) and (3):

Earliest_Request_Time=2015-01-31T4:59:10+08:00

Latest_Request_Time=2015-01-31T4:59:37+08:00

If the actual request time is:

Actual_Request_Time=2015-01-31T4:59:30+08:00

If the current bit rate is 200 Kb/s, the parameters of variables are as follows

| Earliest_Request_Time | 2015-01-31T4:59:10+08:00 |
|---|---|
| Latest_Request_Time | 2015-01-31T4:59:37+08:00 |
| Actual_Request_Time | 2015-01-31T4:59:30+08:00 |
| Receive_Time | 2015-01-31T4:59:50+08:00 |
| Δ t | 20 s |
| Δ t * bitrate | 4 M |
| Buffer_Size | 2 Mb |

Where Buffer_Size takes the minimum value of Δt*bitrate and Asset_Size, i.e., 2 Mb.

Therefore, in the example, Image. 1 is discarded because the given Available_Time is late. For Audio. 1, the time at which the sending shall be requested in advance by the terminal and the size of the cache window that shall be prepared can be got based on Available_Time and Asset_Size given in the CI.

Embodiment 2

To solve the problem that the content of the heterogeneous terminal in the broadcast and the broadband cannot be synchronized due to the broadband congestion, and also to reduce the extra expenditure of the client due to the caching, The embodiment provides a resource dynamic request time window and terminal cache mechanism under the heterogeneous network transmission, wherein Available_Time and Asset_Size attributes of the media content are added in the MPT table and MPU signaling part for the existing signaling at a MMT, so that the client terminal gets the time when the corresponding media content is available; at the same time, the client terminal determines the network bandwidth and the network uplink and downlink delay under the current broadband network through the corresponding method in the network; the client terminal calculates the time interval for transmitting a request for caching in advance and the size of a cache window required by the terminal through the available time of the content of a broadband source and the delay of a broadband channel.

In the embodiment, Available_Time and Asset_Size attributes of the media content are added in the MPT table, CI file or MPU signaling part, so that the client terminal gets the time when the corresponding media content is available. The technology realization of this section is the same as that of Embodiment 1 and differs from Embodiment 1 in that the method of determining the uplink and downlink delay of the network.

Specifically, in the embodiment, the cache mechanism for dynamically allocating the size of the cache window is designed based on the following ideas: The existing attributes in the CI file include the time at which the object normally begins to present—begin, and meanwhile the uplink delay—$D_f$, downlink delay—$D_t$ and bandwidth of the broadband network—Bandwidth under the current broadband network can be got by sending the HRBM message and ARQ message in the network. After Available_Time and Asset_Size attributes of available time of the broadband content are added in the signaling or other places, a threshold—Threshold is set; if the downlink delay $D_t$ is less than the Threshold, the delay is ignored and there is no need to allocate extra cache for the media content transferred by the broadband in the system; if $D_t$ is more than the Threshold, the time interval in which the media content in the broadband is requested to be sent in advance can be determined through the method in the specific solution and a cache window is assigned to the terminal. If the network delay is large and Available_Time provided by the content provider does not meet the condition that the advanced caching is kept in synchronization, the auxiliary content transferred via the broadband channel is discarded directly.

The specific solution is as follows (the following steps can be selected and combined according to the actual situation):

1) Available_Time and Asset_Size attributes of the corresponding content are added in the signaling or other places;
2) The client terminal gets the uplink delay $D_f$, downlink delay $D_t$ and bandwidth of the broadband network Bandwidth under the current broadband network through the corresponding method in the IP network, for example by transmitting the signaling or sending the ARQ message;

3) The client obtains the available time of the corresponding media content—Available_Time, normal play time—begin and the size of the corresponding content—Asset_Size by parsing the signaling;
4) If $D_t$<Threshold, the delay is ignored; if $D_t$>Threshold, the time window for the terminal to send a request and the size of cache assigned by the terminal are calculated by the following method:
1̂ The time required for the service provider to transfer a content unit
Data_Transfer_Time can be calculated based on the size of a content unit and the bit rate in the current broadband environment;
2̂ If Available_Time is "unknown" or there is no such attribute in CI, no processing is performed; if Available_Time is "anytime", it is required to skip this step and go to 3̂; if Available_Time is a specific UTC time interval, the following judgment is made based on the earliest time:

$$\text{Available\_Time} + D_t + \text{Data\_Transfer\_Time} < \text{begin} \quad (1)$$

If condition (1) is not met, it indicates that the available time of the media content to be transferred is too late and the media content cannot reach the terminal in time under the current network delay, so the part of the content is required to be discarded;
if condition (1) is met, it indicates that the asynchronization problem caused by the current network delay can be resolved through the advanced caching and the calculation in the next step is required;
3̂ The time interval in which the media content is requested by the terminal to be sent in advance is calculated:
Earliest request time:

$$\text{Earliest\_Request\_Time} = \text{Available\_Time} - D_f \quad (2)$$

Latest request time:

$$\text{Latest\_Request\_Time} = \text{begin} - D_f - D_t - \text{Data\_Transfer\_Time} \quad (3)$$

The actual request time is between these two times:

$$\text{Earliest\_Request\_Time} < \text{Actual\_Request\_Time} < \text{Latest\_Request\_Time} \quad (4)$$

4̂ After a request time is selected, the time at which the terminal can begin to receive the data of the service provider is:

$$\text{Receive\_Time} = \text{Actual\_Request\_Time} + D_f - D_t \quad (5)$$

The time to receive the data before the time from the terminal to begin is:

$$\Delta t = \text{begin} - \text{Receive\_Time} \quad (6)$$

5̂ If Asset_Size attribute is given in CI, the size of the cache window assigned by the terminal is:

$$\text{Buffer\_Size} = \min\{\Delta t * \text{bitrate}, \text{Asset\_Size}\} \quad (7)$$

If Asset_Size attribute is not given in CI, the size of the cache window assigned by the terminal is:

$$\text{Buffer\_Size} = \Delta t * \text{bitrate} \quad (8)$$

The variables used in the solution and their meanings are summarized in the following table:

| Variable | Meaning and purpose |
| --- | --- |
| begin | Time at which the client normally plays the specific content |
| Available_Time | Time at which the content to be transferred is ready at the content provider and can be transferred |
| Asset_Size | Size of media content |
| Df | Uplink delay in the network |
| Dt | Downlink delay in the network |
| Bandwidth | Bandwidth of broadband network |
| Threshold | To determine whether the current delay will affect the synchronization of main and auxiliary videos |
| Earliest_Request_Time | Earliest request time of the terminal |
| Latest_Request_Time | Latest request time of the terminal |
| Actual_Request_Time | Actual request time of the terminal |
| Receive_Time | Time at which the terminal begins to receive data |

An example is given below:

It is known that the current state of the system is as follows when the client receives the corresponding signaling. Here, Threshold is set to 0.1 s, and Data_Transfer_Time is generally based on the current data size and bit rate and 3 s is taken here.

| Parameter | Value |
| --- | --- |
| Df | 10 s |
| Dt | 10 s |
| Bandwidth | 10 Mbps |

An image and audio file information contained in the signaling are as follows:

| File | begin | Available_Time | Asset_Size |
| --- | --- | --- | --- |
| Image. 1 | 2015-01-31T5:00:00+08:00 | 2015-01-31T4:59:50+08:00 | 512 Kb |
| Audio. 1 | 2015-01-31T5:00:00+08:00 | 2015-01-31T4:59:20+08:00--2015-01-31T4:59:50+08:00 | 2 Mb |

The current network delay is 10 s that is much larger than the Threshold of 0.1 s, it indicates that the broadband delay of 10 s is unacceptable and it is required to request to transfer the content in advance.

For Image. 1, the available time is all of the time after 4:59:50 (Beijing time), but the available time is too late and does not meet the condition (1), that is, the content is transferred to the terminal when it cannot be played, so the content is discarded.

For Audio. 1, the available time is between 4:59:20 and 4:59:50 (Beijing time) and 4:59:20 meets the condition (1), so the time interval in which the request is sent can be obtained by equations (2) and (3):

$$\text{Earliest\_Request\_Time} = 2015\text{-}01\text{-}31T4\text{:}59\text{:}10\text{+}08\text{:}00$$

$$\text{Latest\_Request\_Time} = 2015\text{-}01\text{-}31T4\text{:}59\text{:}37\text{+}08\text{:}00$$

If the actual request time is:

$$\text{Actual\_Request\_Time} = 2015\text{-}01\text{-}31T4\text{:}59\text{:}30\text{+}08\text{:}00$$

If the current bit rate is 200 Kb/s, the parameters of variables are as follows

| | |
|---|---|
| Earliest_Request_Time | 2015-01-31T4:59:10+08:00 |
| Latest_Request_Time | 2015-01-31T4:59:37+08:00 |
| Actual_Request_Time | 2015-01-31T4:59:30+08:00 |
| Receive_Time | 2015-01-31T4:59:50+08:00 |
| Δt | 20 s |
| Δt * bitrate | 4 M |
| Buffer_Size | 2 Mb |

Where Buffer_Size takes the minimum value of Δt*bitrate and Asset_Size, i.e., 2 Mb.

Therefore, in the example, Image. 1 is discarded because the given Available_Time is late. For Audio. 1, the time at which the sending shall be requested in advance by the terminal and the size of the cache window that shall be prepared can be got based on Available_Time and Asset_Size given in the CI.

If the receiver fails to get the Available_Time of the Asset in the old system, to ensure the system compatibility, the following processing methods can be taken in the system: the terminal sends a request (only once) at an appropriate time before the begin time; after the uplink delay $D_f$, the server receives the request at the time t:

a) If the time t is before the Available_Time of the Asset and the time interval determined based on the size of the waiting time window of the receiver is large, the server sends a message to the receiver and notifies the receiver of the Available_Time of the Asset. The server sends the Asset at the Available_Time.

b) If the time t is before the Available_Time of the Asset but the time interval determined based on the size of the waiting time window of the receiver is not large, the server waits directly to the Available_Time, and then sends the Asset directly.

c) If the time t is after the Available_Time of the Asset, the following judgment is made:

$$t+D_f<\text{Begin} \quad (9)$$

If equation (9) is satisfied, it indicates that the receiver can receive the Asset on time sent at the time; therefore, the server sends the Asset at the current time. If equation (9) is not satisfied, it indicates that the Asset sent at the current time is late.

In Embodiment 2 of the invention, the one-way network delay in the broadband network is modified to the network uplink and downlink delay and the method of determining the size of the request time window and cache window is also modified, so that the client terminal gets the network bandwidth and uplink and downlink delay under the current broadband network by transmitting the signalling or sending the ARQ message in the network, and the client terminal calculates the time interval for transmitting a request for caching in advance and the size of a cache window required by the terminal through the available time of the content of a broadband source and the delay of a broadband channel, thus providing a better compatibility.

Embodiment 3

Figure 2:
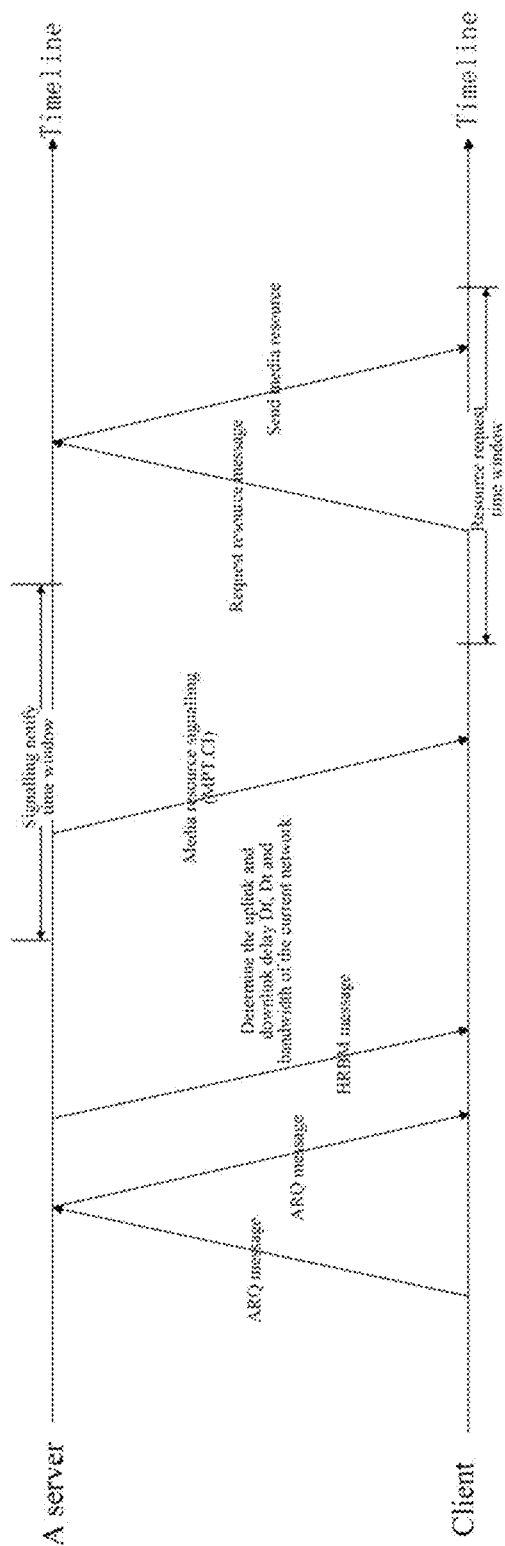
FIG. 2 is a schematic diagram of a resource request model of the heterogeneous media network in Embodiment 3.
Figure 3:
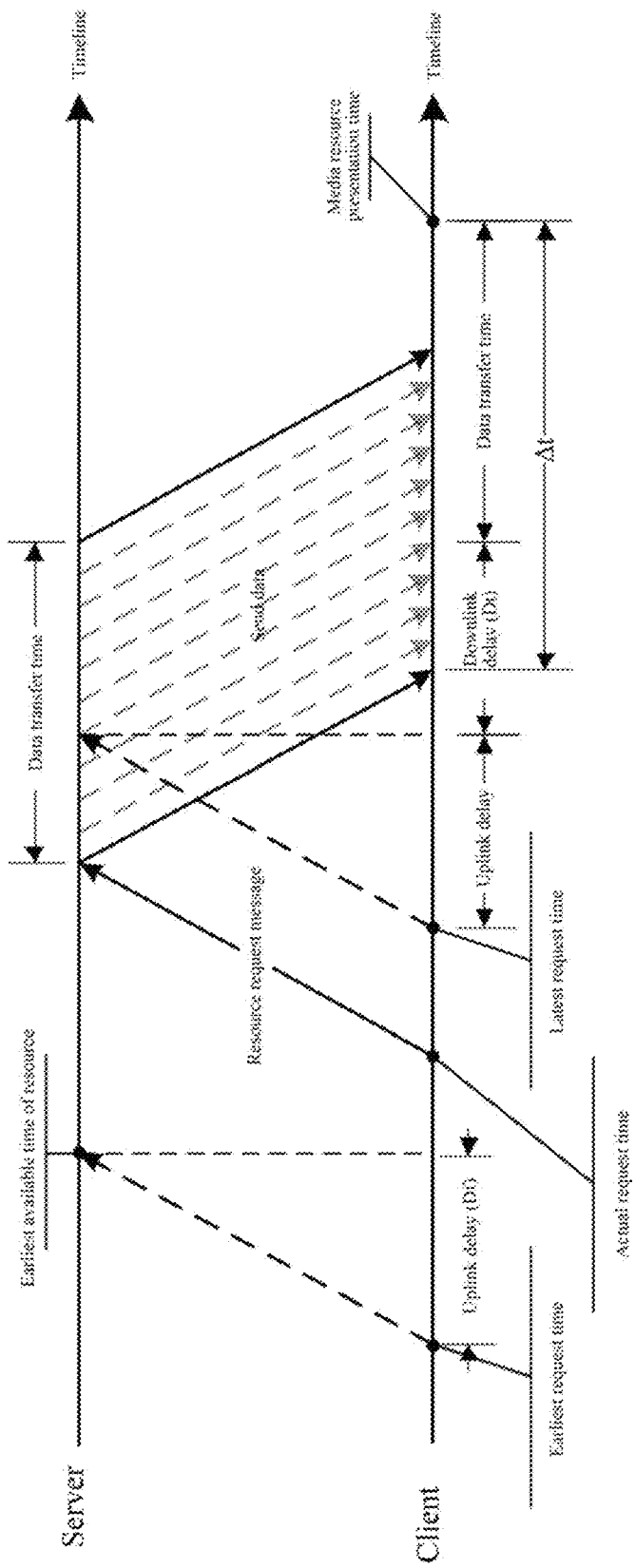
FIG. 3 is a flow chart of calculating the dynamic time window in which the client sends the request in the Embodiment 3.
Figure 4:
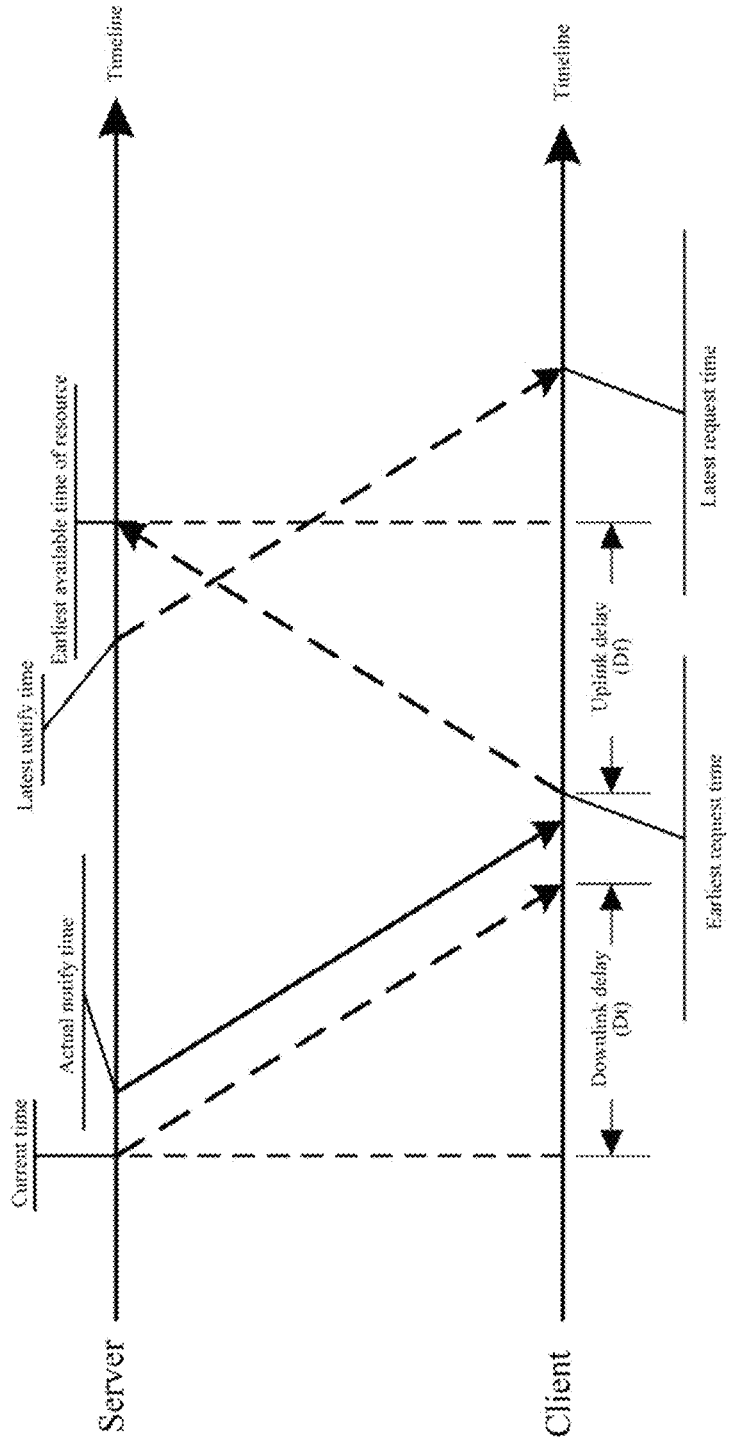
FIG. 4 is a flow chart of calculating the time at which the server sends the signaling in the Embodiment 3.

As shown in FIGS. 2-4, the embodiment solves the problem that media-related resources cannot be played synchronously due to the network congestion in the heterogeneous media network transmission. The difference from the above embodiments is that the method of adding the time window information for each media resource from different sources with the reserved field is given and the method of calculating the time at which the signalling is notified to be sent is provided in general_location_info( ).

The following three parts are included in the embodiment:

I. Available_Time Information of the Resource is Added in the MMT_General_Location_Info( ) Descriptor To solve the problem that the resource is presented on time and synchronized, new attributes of available begin and available end are added for each part of the content in the original signalling or other places, to illustrate the time at which the content to be transferred in the current network is ready at the content provider and can be transferred and the access end time.

In the above Embodiment 1, the methods of adding Available_Time in the MPT, CI and MPU have been given respectively, and the method and example of adding the available time in the MMT_general_location_info( ) descriptor of the MPT are added as follows:

The MMT_general_location_info( ) descriptor in the MPT provides the source information of the media resource and the relevant signalling, wherein the location_type is the location information of the asset resource corresponding to the values of 0x00~0x06 and 0x0C, the values of 0x07~0x0B correspond to the information of the signalling source, 0x0D~0x9F are fields reserved for the ISO, and 0xA0~0xFF are fields reserved for the dedicated system. To consider the compatibility with the previous system, the reserved values of 0xA0~0xA7 are used in the reserved location_type value.

The definition of the location information field described is consistent with 0x00~0x06 and 0x0C in the field corresponding to each location_type and available_begin and available_end attributes are added at the end of each location information field described.

The added definition fields available begin and available_end are as follows:

| MMT_general_location_info Syntax | | | |
|---|---|---|---|
| Syntax | Value | No. of bits | Mnemonic |
| MMT_general_location_info( ) { | | | |
| location_type | | 8 | uimsbf |
| if (location_type == '0x00') { | | | |
| packet_id | | 16 | uimsbf |
| } else if (location_type =='0x01') { | | | |
| ipv4_src_addr | | 32 | uimsbf |
| ipv4_dst_addr | | 32 | uimsbf |
| dst_port | | 16 | uimsbf |
| packet_id | | 16 | uimsbf |
| } else if (location_type == '0x02') { | | | |
| ipv6_src_addr | | 128 | uimsbf |
| ipv6_dst_addr | | 128 | uimsbf |
| dst_port | | 16 | uimsbf |
| packet_id | | 16 | uimsbf |
| } else if (location_type == '0x03') { | | | |
| network_id | | 16 | uimsbf |
| MPEG_2_transport_stream_id | | 16 | uimsbf |
| reserved | '111' | 3 | bslbf |
| MPEG_2_PID | | 13 | uimsbf |
| } else if ( location_type == '0x04') { | | | |
| ipv6_src_addr | | 128 | uimbsf |
| ipv6_dst_addr | | 128 | uimbsf |
| dst_port | | 16 | uimsbf |
| reserved | '111' | 3 | bslbf |
| MPEG_2_PID | | 13 | uimbsf |
| } else if (location_type == '0x05') { | | | |
| URL_length | N1 | 8 | uimsbf |
| for (i=0; i<N1; i++) { | | | |
| URL_byte | | 8 | char |
| } | | | |

-continued

| MMT_general_location_info Syntax | | | |
|---|---|---|---|
| Syntax | Value | No. of bits | Mnemonic |
| } else if (location_type =='0x06') { | | | |
| length | N2 | 16 | uimsbf |
| for (i=0;i<N2;i++) { | | | |
| byte | | 8 | uimsbf |
| } | | | |
| } else if (location_type == '0x07') { | | | |
| } else if (location_type == '0x08') { | | | |
| message_id | | 8 | uimsbf |
| } else if (location_type == '0x09') { | | | |
| packet_id | | 16 | uimsbf |
| message_id | | 8 | uimsbf |
| } else if (location_type == '0x0A') { | | | |
| ipv4_src_addr | | 32 | uimsbf |
| ipv4_dst_addr | | 32 | uimsbf |
| dst_port | | 16 | uimsbf |
| packet_id | | 16 | uimsbf |
| message_id | | 8 | uimsbf |
| } else if (location_type == '0x0B') { | | | |
| ipv6_src_addr | | 128 | uimsbf |
| ipv6_dst_addr | | 128 | uimsbf |
| dst_port | | 16 | uimsbf |
| packet_id | | 16 | uimsbf |
| message_id | | 8 | uimsbf |
| } else if(location_type == '0x0C') { | | | |
| ipv4_src_addr | | 32 | uimbsf |
| ipv4_dst_addr | | 32 | uimbsf |
| dst_port | | 16 | uimbsf |
| reserved | '111' | 3 | bslbf |
| MPEG_2_PID | | 13 | uimbsf |
| }else if(location_type == '0xA0') { | | | |
| packet_id | | 16 | uimsbf |
| available_begin | | 64 | uimsbf |
| available_end | | 64 | uimsbf |
| } else if (location_type == '0xA1') { | | | |
| ipv4_src_addr | | 32 | uimsbf |
| ipv4_dst_addr | | 32 | uimsbf |
| dst_port | | 16 | uimsbf |
| packet_id | | 16 | uimsbf |
| available_begin | | 64 | uimsbf |
| available_end | | 64 | uimsbf |
| } else if (location_type == '0xA2') { | | | |
| ipv6_src_addr | | 128 | uimsbf |
| ipv6_dst_addr | | 128 | uimsbf |
| dst_port | | 16 | uimsbf |
| packet_id | | 16 | uimsbf |
| available_begin | | 64 | uimsbf |
| available_end | | 64 | uimsbf |
| } else if (location_type == '0xA3') { | | | |
| network_id | | 16 | uimsbf |
| MPEG_2_transport_stream_id | | 16 | uimsbf |
| reserved | '111' | 3 | bslbf |
| MPEG_2_PID | | 13 | uimsbf |
| available_begin | | 64 | uimsbf |
| available_end | | 64 | uimsbf |
| } else if ( location_type == '0xA4') { | | | |
| ipv6_src_addr | | 128 | uimbsf |
| ipv6_dst_addr | | 128 | uimbsf |
| dst_port | | 16 | uimbsf |
| reserved | '111' | 3 | bslbf |
| MPEG_2_PID | | 13 | uimbsf |
| available_begin | | 64 | uimsbf |
| available_end | | 64 | uimsbf |
| } else if (location_type == '0xA5') { | | | |
| URL_length | N1 | 8 | uimsbf |
| for (i=0; i<N1; i++) { | | | |
| URL_byte | | 8 | char |
| } | | | |
| available_begin | | 64 | uimsbf |
| available_end | | 64 | uimsbf |
| } else if (location_type == '0xA6') { | | | |
| length | N2 | 16 | uimsbf |
| for (i=0;i<N2;i++) { | | | |
| byte | | 8 | uimsbf |
| } | | | |
| available_begin | | 64 | uimsbf |
| available_end | | 64 | uimsbf |
| }else if(location_type == '0xA7') { | | | |
| ipv4_src_addr | | 32 | uimbsf |
| ipv4_dst_addr | | 32 | uimbsf |
| dst_port | | 16 | uimbsf |
| reserved | '111' | 3 | bslbf |
| MPEG_2_PID | | 13 | uimbsf |
| available_begin | | 64 | uimsbf |
| available_end | | 64 | uimsbf |
| } | | | |
| } | | | | available_begin—the earliest available time of the media resource. If the field is all set to 0, it indicates that the earliest available time of the resource is unknown; if the field is all set to 1, it indicates that the earliest available time of the resource is earlier than the current time;

available_end—the latest available time of the media resource. If the field is all set to 0, it indicates that the latest available time of the resource is unknown; if the field is all set to 1, it indicates that the resource is always available after it is ready;

available_begin and available_end are used as follows:

| available_begin | available_end | Description |
|---|---|---|
| All set to 0 | All set to 0 | The available time is unknown |
| All set to 1 | All set to 1 | The part of the content is always available |
| Specific UTC time | All set to 1 | The part of the content is always available after availble_begin time |
| Specific UTC time | Specific UTC time | The part of the content is available between two time |

That is:

(1) If a resource is available within a time period, the newly added attributes are assigned:

available_begin is assigned to the begin time "UTC1" and available_end is assigned to the end time "UTC2";

(2) If a resource is always available from a certain time, the newly added attributes are assigned:

available_begin is assigned to the begin time "UTC1" and the available_end field is all set to 1;

(3) If a resource is available at any time, the newly added attributes are assigned: The available_begin field is all set to 1 and the available_end field is all set to 1;

(4) If the availability of a resource is unknown, the newly added attributes are assigned:

The available_begin field is all set to 0 and the available_end field is all set to 0.

Corresponding to the location_type, the reserved fields in 0xA0~0xFF are used and the reserved fields in 0x0D~0x9F can also be used. The available time information is added in the newly defined location_type based on 0x00~0x06 and 0x0C location_type respectively.

The newly added location_type is described below:

| Value | Description |
|---|---|
| | Value of location_type |
| 0x00 | An Asset in the same MMTP packet flow as the one that carries the data structure to which this MMT_general_location_info( ) belongs |
| 0x01 | MMTP packet flow over UDP/IP (version 4) |
| 0x02 | MMTP packet flow over UDP/IP (version 6) |
| 0x03 | A program within an MPEG-2 TS in a broadcast network. The program is indicated by a PMT PID is described in ISO/IEC 13818-1. |
| 0x04 | An elementary stream (ES) in an MPEG-2 TS over the IP broadcast network |
| 0x05 | URL |
| 0x06 | reserved for private location information |
| 0x07 | The same signalling message as the one that carries the data structure to which this MMT_general_location_info( ) belongs |
| 0x08 | A signalling message delivered in the same data path as the one that carries the data structure to which this MMT_general_location_info( ) belongs |
| 0x09 | A signalling message delivered in a data path in the same UDP/IP flow as the one that carries the data structure to which this MMT_general_location_info( ) belongs |
| 0x0A | A signalling message delivered in a data path in a UDP/IP (version 4) flow |
| 0x0B | A signalling message delivered in a data path in a UDP/IP (version 6) flow |
| 0x0C | An elementary stream (ES) in an MPEG-2 TS over the IP v4 broadcast network |
| 0x0D~0x9F | reserved for ISO use |
| 0xA0 | An Asset in the same MMTP packet flow as the one that carries the data structure to which this MMT_general_location_info( ) belongs with additional available begin and end time |
| 0xA1 | MMTP packet flow over UDP/IP (version 4)with additional available begin and end time |
| 0xA2 | MMTP packet flow over UDP/IP (version 6)with additional available begin and end time |
| 0xA3 | A program within an MPEG-2 TS in a broadcast networkwith additional available begin and end time. The program is indicated by a PMT PID is described in ISO/IEC 13818-1. |
| 0xA4 | An elementary stream (ES) in an MPEG-2 TS over the IP broadcast networkwith additional available begin and end time |
| 0xA5 | URLwith additional available begin and end time |
| 0xA6 | reserved for private location informationwith additional available begin and end time |
| 0xA7 | An elementary stream (ES) in an MPEG-2 TS over the IP v4 broadcast networkwith additional available begin and end time |
| 0xA0~0xFF | reserved for private use |

II. Method of Calculating the Time Request Window by the Client Terminal in Different Types of Server Systems In Embodiment 1, the client terminal dynamically requests the time window of the resource after the signalling is parsed to get the Available_Time of the media resource:

$$(Earliset\_Request\_Time, Latest\_Request\_Time) \quad (1)$$

Earliest request time Earliest_Request_Time:

$$Earliest\_Request\_Time = Available\_Time - D_f \quad (2)$$

Latest request time Latest_Request_Time:

$$Latest\_Request\_Time = begin - D_f - D_t - Data\_Transfer\_Time \quad (3)$$

The actual request time is between these two times:

$$Earliest\_Request\_Time < Actual\_Request\_Time < Latest\_Request\_Time \quad (4)$$

Where $D_f$ is the uplink delay of the current media network, $D_t$ is the downlink delay of the current media network and Data_Transfer_Time is the time required for the server to send the media resource.

In the practical application, there are generally two types of server; when a resource request is received, if the resource on type A server is not ready, an error message is returned directly, for example, HTTP server, if the resource on type B server is not ready, a message is not returned and the resource is sent after waiting for the resource to be ready, for example, MMT server.

In Embodiment 1, the request time window is calculated for type A server.

In Case of Type B Server, the Method of Calculating the Available_Time by the Client Terminal is as Follows:

Type B server can receive the request message and send the request message after waiting for the resource to be ready; the client terminal can send a message requesting the resource when the signalling is parsed to get the existence of a resource, so for the client terminal of type B server:

$$Earliest\_Request\_Time = \text{Time when the client terminal parses the signalling to get the existence of a resource} \quad (5)$$

$$Latest\_Request\_Time = Begin - Data\_Transfer\_Time - D_t - D_f \quad (6)$$

III. Method of Calculating the Time Window for the Server to Notify Available_Time Signalling Under some media transmission networks, it is assumed that the time when the server gets the Avaliable_Time of a resource is $T_0$ and $T_0$ may be late, resulting in late time when the client terminal receives the relevant signalling after the sender sends the signalling; even if the client terminal calculates the correct request time window, the current time has been later than Latestest_Request_Time, so requesting resource still fails.

In this Case, the Mechanism for the Server to Determine the Signalling Sending Time is Given as Follows:

On the server, the time window for the client terminal to dynamically request the resource is calculated through the same method, and then the following judgments are made:

$$T_0+D_t<\text{Latestest\_Request\_Time} \tag{7}$$

If equation (7) is not satisfied, it indicates that the Receiver can only get the Available_Time attribute in the signalling after Latest_Request_Time, so the resource cannot be requested in time; in this case, no relevant signalling is sent; if equation (7) is satisfied, it indicates that the Receiver can get the Available_Time attribute in the signalling before Latest_Request_Time, so it can continue to get the time interval for sending the signalling by the following method.

Calculation of latest notify time Latest_Notify_Time:

$$\text{Latest\_Notify\_Time}=\text{Latest\_Request\_Time}-D_t \tag{8}$$

The actual time of notifying the signalling Actual_Notify_Time is within the following interval:

$$T_0<\text{Actual\_Notify\_Time}<\text{Latest\_Notify\_Time} \tag{9}$$

Where $D_t$ is the downlink delay of the current network.

Embodiment 4

The embodiment solves the problem that a request cannot be made in time due to the unknown available time of the media resource in the heterogeneous media network transmission. The difference from the above Embodiment 3 is that the method of describing the available time information of media resources from different sources by adding the descriptor AT_descriptor( ) is given and the flow that the new and old clients parse the newly added descriptors is given. New attributes of available_begin and available_end are added for each part of the media resource content in the original signalling or other places, to illustrate the time at which the media resource is ready at the server and can be requested to be got.

Detailed description of the embodiment is as follows:

I. A Bit is Taken in the Reserved Field of the MPT as Available_Time_Flag, to Indicate Whether the Current Server Sends the Available Time Information of the Resource.

To consider the compatibility with the previous system and notify the client whether the available time of a resource is known in the signalling, a bit is taken in the reserved field of the MPT as an indicating bit, to indicate whether the current server sends the available time information of the resource.

avialable_time_flag is defined in the reserved field of the MPT specifically as follows:

available_time_flag: it is used to indicate whether the available time of the media resource is sent; if the field is set to 0, it indicates that the available time of the media resource is not ready and no relevant signalling is sent; if the field is set to 1, it indicates that the available time information of the media resource has been sent with the signaling.

The newly defined available_time_flag is located in the MPT as follows:

| MP table syntax | | | |
|---|---|---|---|
| Syntax | Value | No. of bits | Mnemonic |
| MP_table( ) { | | | |
|   table_id | | 8 | uimsbf |
|   version | | 8 | uimsbf |
|   length | | 16 | uimsbf |
|   reserved | '11 1111' | 6 | bslbf |
|   MP_table_mode | | 2 | bslbf |
|   If (table_id == SUB-SET_0_MPT_TABLE_ID) { | | | |
|     MMT_package_id { | N1 | | |
|       MMT_package_id_length | | 8 | uimsbf |
|       for (i=0; i< N1; i++) { | | | |
|         MMT_package_id_byte | | 8 | uimsbf |
|       } | | | |
|     } | | | |
|   } | | | |
|   MP_table_descriptors { | N2 | | |
|     MP_table_descriptors_length | | 16 | uimsbf |
|     for (i=0; i<N2; i++) { | | | |
|       MP_table_descriptors_byte | | 8 | uimsbf |
|     } | | | |
|   } | | | |
| } | | | |
| number_of_assets | N3 | 8 | uimsbf |
| for (i=0; i<N3; i++) { | | | |
|   Identifier_mapping( ) | | | |
|   asset_type | | 32 | char |
|     available_time_flag | | 1 | bslbf |
|     reserved | '1111 11' | | bslbf |
|   asset_dock_relation_flag | | 6 | bslbf |
|   if (asset_clock_relation_flag == 1) { | | | |
|     asset_clock_relation_id | | 1 | uimsbf |
|     reserved | '1111 111' | | bslbf |
|     asset_time_scale_flag | | 8 | bslbf |
|     if (asset_time_scale_flag == 1) { | | 7 | |
|       asset_timescale | | 1 | uimsbf |
|     } | | | |
|   } | | 32 | |
|   asset_location { | | | |
|     location_count | N6 | | uimsbf |
|     for (i=0; i<N6; i++) { | | | |
|     MMT_general_location_info( ) | | 8 | |
|     } | | | |
|   } | | | |
|   asset_descriptors { | | | |
|     asset_descriptors_length | N5 | | uimsbf |
|     for (i=0; j<N5; j++) { | | | |
|       asset_descriptors_byte | | 16 | uimsbf |
|     } | | | |
|   } | | 8 | |
| } | | | |
| } | | | |

II. The Available Time Attribute of the Media Resource is Added

The newly added attributes available_begin and available_end can be placed in the signaling, CI, MPU and other locations; two specific solutions are given below and one of them is selected in use:

Method 1: A new descriptor AT descriptor is added in the signaling and the descriptor is used to describe the available time of the media resource;

Method 2: The available time attribute of the media resource is added in the signaling MPT; the client terminal requests the media resource in advance in the corresponding interval through the available time of the media resource in the signaling. See the description that Available_Time information of the resource is added in the MMT_general_location_info( ) descriptor in Example 3 for implementation details of method 2 that will not be repeated here.

The details of the preferred embodiment of the above method 1 are described below:

The Descriptor AT Descriptor is Added in the Signaling to Describe the Available Time of the Media Resource A new descriptor AT descriptor is added to transfer the available time information of the current media resource. The AT descriptor is sent with the asset_descriptors{ } of the MPT when it is sent The AT descriptor is defined as follows:

1. Introduction

An AT descriptor contains the time information that the resource is ready on the sender and available. If the available time of the media resource is known, the AT descriptor can be included in the MPT.

2. Syntax

The AT descriptor has the following three syntax definition modes:

Mode 1 AT descriptor syntax

| Syntax | Value | No. of bits | Mnemonic |
|---|---|---|---|
| AT_descriptor( ) { | N1 | | |
| descriptor_tag | | 16 | uimsbf |
| descriptor_length | | 32 | uimsbf |
| available_time_count | | 8 | uimsbf |
| for(i=0;i<N1;i++){ | | | |
| location_index | | 8 | uimsbf |
| available_begin | | 32 | uimsbf |
| available_end | | 32 | uimsbf |
| } | | | |
| } | | | |

In mode 1, six attributes are defined in the table, including descriptor_tag, descriptor_length, available_time_count, location_index, available_begin and available_end. In this case, the server only sends an AT descriptor that contains the available time information of all address sources. available_time_count represents the count of available time information corresponding to different location_type in MPT. The location_index attribute provides the index of different location address sources in the MPT corresponding to the available time information in the current cycle, and the index can be used to obtain the available time of the resource accordingly.

Mode 2 AT descriptor syntax

| Syntax | Value | No. of bits | Mnemonic |
|---|---|---|---|
| AT_descriptor( ) { | | | |
| descriptor_tag | | 16 | uimsbf |
| descriptor_length | | 32 | uimsbf |
| location_count | | 8 | uimsbf |
| for(i=0;i<N2;i++){ | | | |
| location_index | | 8 | uimsbf |
| available_begin | | 32 | uimsbf |
| available_end | | 32 | uimsbf |
| } | | | |
| } | | | |

In mode 2, six attributes are defined in the table, including descriptor_tag, descriptor_length, location_count, location_index, available_begin and available_end. In this case, the server only sends an AT descriptor that contains the available time information of all address sources. location_count represents the count of different location sources in MPT. The location_index attribute provides the index of different location sources in the MPT corresponding to the available time information in the current cycle, and the index can be used to obtain the available time of the resource accordingly. If the available time of the resource from a location source is unknown, the available_begin and available_end attributes are all set to '0'.

Mode 3 AT descriptor syntax

| Syntax | Value | No. of bits | Mnemonic |
|---|---|---|---|
| AT_descriptor( ) { | | | |
| descriptor_tag | | 16 | uimsbf |
| descriptor_length | | 32 | uimsbf |
| location_index | | 8 | uimsbf |
| available_begin | | 32 | uimsbf |
| available_end | | 32 | uimsbf |
| } | | | |

In mode 3, five attributes are defined in the table, including descriptor_tag, descriptor_length, location_index, available_begin and available_end. In this case, the server will send multiple AT descriptors to respectively indicate the available time information of different address sources. The location_index attribute provides the index of different location address sources in the MPT corresponding to the available time information in the current cycle, and the index can be used to obtain the available time of the resource accordingly.

3. Semantics descriptor_tag—the tag value of the current descriptor, corresponding to the descriptor, the reserved tag value of the descriptor is 0x8000;

descriptor_length—describes the length of the field from the next field to the descriptor, location_index—represents the index of address information in MMT_general_location_info corresponding to the time described by the current descriptor, available_begin—the earliest available time of the media resource. If the field is all set to 0, it indicates that the earliest available time of the resource is unknown; if the field is all set to 1, it indicates that the earliest available time of the resource is earlier than the current time;

available_end—the latest available time of the media resource. If the field is all set to 0, it indicates that the latest available time of the resource is unknown; if the field is all set to 1, it indicates that the resource is always available after it is ready;

available_time_count—the count of available time information corresponding to different location_type in MPT;

location_count—the count of different location sources in MPT;

available_begin and available_end are used as follows:

| available_begin | available_end | Description |
|---|---|---|
| All set to 0 | All set to 0 | The available time is unknown |
| All set to 1 | All set to 1 | The part of the content is always available |
| Specific UTC time | All set to 1 | The part of the content is always available after availble begin time |
| Specific UTC time | Specific UTC time | The part of the content is available between two time |

That is:

(1) If a resource is available within a time period, the newly added attributes are assigned:

available_begin is assigned to the begin time "UTC1" and available_end is assigned to the end time "UTC2";

(2) If a resource is always available from a certain time, the newly added attributes are assigned:

available_begin is assigned to the begin time "UTC1" and the available_end field is all set to 1;

(3) If a resource is available at any time, the newly added attributes are assigned:

The available_begin field is all set to 1 and the available_end field is all set to 1;

(4) If the availability of a resource is unknown, the newly added attributes are assigned:

The available_begin field is all set to 0 and the available_end field is all set to 0.

For the solution, the AT descriptor can be recognized from the descriptor tag even if there is no available_time_flag, so available_time_flag is optional.

Figure 5:
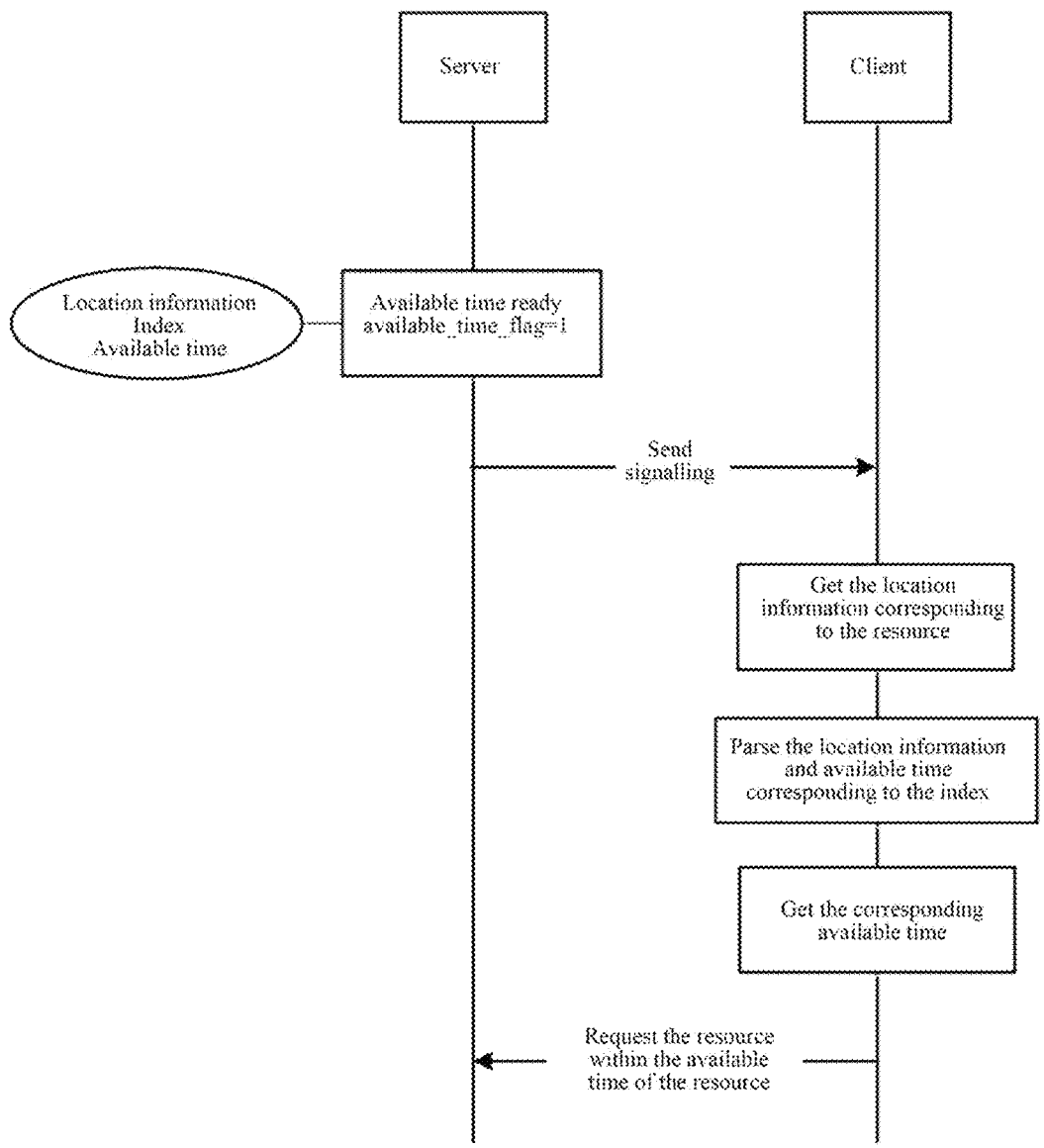
FIG. 5 is a flow chart of the new client to process the newly sent signaling in Embodiment 4.
Figure 6:
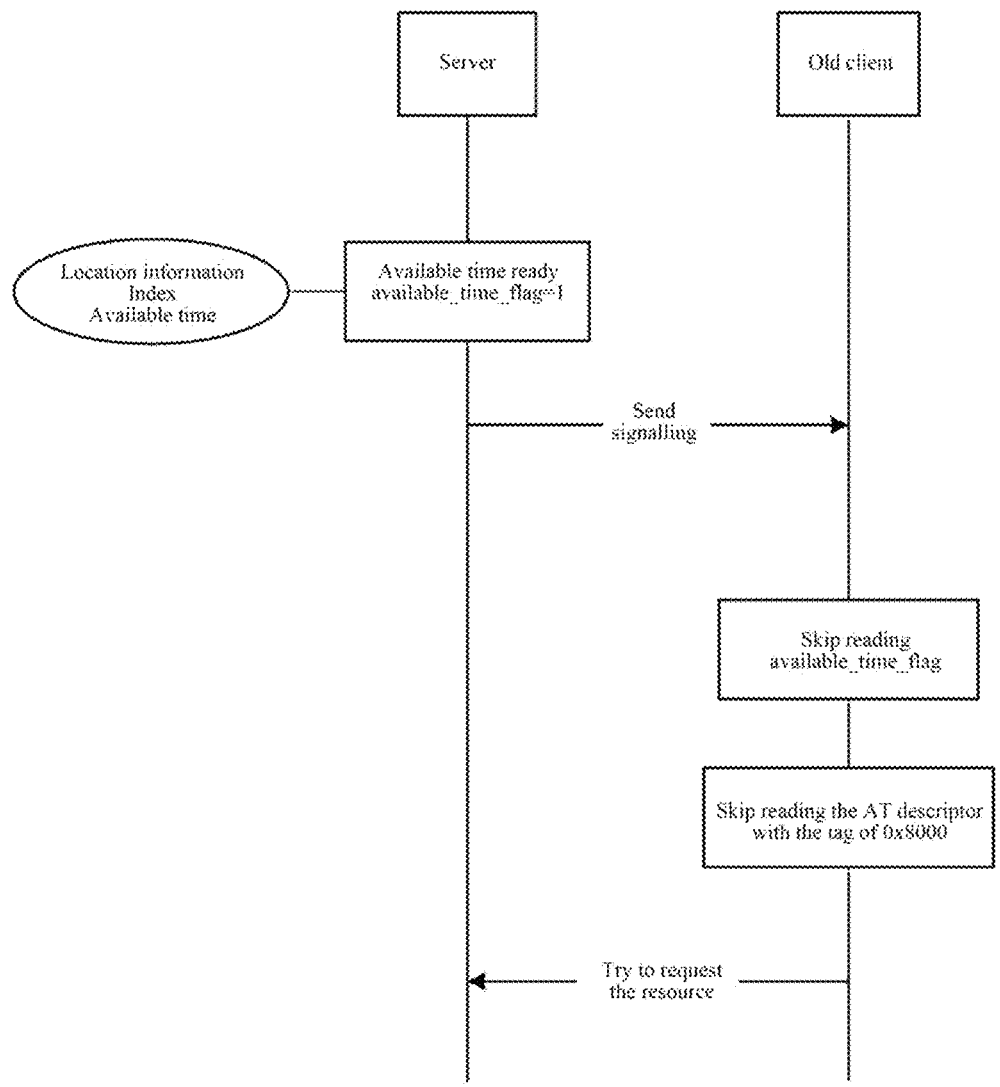
FIG. 6 is a flow chart of the old client to process the newly sent signaling in the Embodiment 4.

A way to transfer the AT descriptor to notify the client of the available time is given below (the detailed flow is shown in FIGS. 5-6):

For the solution in which the AT descriptor is used to transfer the available time:

If the available time of the media resource on the server is unknown, the AT descriptor is not provided in the transmitted signaling and the server sets the 'available_time_flag' identifier in the MPT to '0'.

If the available time of the media resource is known and provided in the AT descriptor in the signaling, the server sets 'available_time_flag' in the MPT to '1'.

For the new client, it will read the content of the AT descriptor and get the 'location_type', 'location_index', 'available_begin' and 'available_end'attributes of the asset, and the client gets the available time information corresponding to the location resource described in MMT_general_location_info( ) through location_index. The client will request the resource in advance within the available time.

For the old client, it will ignore available_time_flag, and when it receives the AT descriptor with the descriptor_tag of 0x8000, it will ignore the AT descriptor and cannot get the available time of the resource because the tag is a reserved field for the old system. The client may request the resource in advance before the content is ready; therefore, requesting the resource fails.

Specific embodiments of the invention are described above. It shall be understood that the invention is not limited to the above-mentioned specific embodiments, and those skilled in the art can make different variants and modifications within the scope of the claims, and it shall not affect the substance of the invention.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A dynamic time window and cache method under the heterogeneous network transmission, comprising steps of: adding Available Time and Asset Size attributes of the media content in the signaling part for the existing signaling at an MMX so that a client terminal gets the time when a corresponding media content is available: at a same time, determining a network bandwidth and the network delay of the content from the broadband to the client under a current broadband network through a corresponding method in the network by a client: calculating a time interval for transmitting a request for caching in advance and a size of a cache window required by a terminal through an available time of the content of a broadband source and the delay of a broadband channel by the client terminal;

wherein existing attributes in the CI file that can be obtained by the terminal include the time at which the object normally begins to present—begin, and meanwhile the terminal can get the uplink delay—Df downlink delay—Dt and bandwidth of the broadband network—Bandwidth under the current broadband network by sending an HRBM message or an ARQ message in the network: after Available Time and Asset Size attributes of available time of the broadband content are added in the signaling, a threshold—Threshold is set: if the downlink delay Dt is less than the Threshold, the delay is ignored and there is no need to allocate extra cache for the media content transferred by the broadband in the system: if Dt is more than the Threshold, the time interval in which the media content in the broadband is requested to be sent in advance is determined and a cache window is assigned to the terminal: if the network delay is large and Available Time provided by the content provider does not meet the condition that the advanced caching is kept in synchronization, the content transferred via the broadband network channel is discarded directly;

wherein the time interval in which the media content in the broadband is requested to be sent in advance is determined and a cache window is assigned to the terminal, and the specific solution is as follows:

1) adding AvailableTime and Asset Size attributes of the corresponding content in the signaling;
2) getting the uplink delay Df, downlink delay Dt and bandwidth of the broadband network Bandwidth by the client terminal under the current broadband network through the corresponding method in the network;
3) obtaining the available time of the corresponding media content Available Time by a client, normal play time begin and the size of the corresponding content Asset_Size by parsing the signaling;
4) if Dt<Threshold, the delay is ignored; if Dt>Threshold, the time window for the terminal to send a request and the size of cache assigned by the terminal are calculated by following method:

calculating a the time required for the service provider to transfer a content unit Data Transfer Time based on the size of a content unit and the bit rate in the current broadband environment;

if Available Time is "unknown" or there is no such attribute in CI, no processing is performed; if Available Time is "anytime", it is required to skip this step and go to Ĉ; if Available Time is a specific UTC time interval, the following judgment is made based on the earliest time:

$$\text{Available\_Time} + Dt + \text{Data\_Transfer\_Time} < \text{begin} \qquad (1)$$

if condition (1) is not met, indicating that the available time of the media content to be transferred is too late and the media content cannot reach the terminal in time under the current network delay, so the part of the content is required to be discarded; if condition (1) is met, indicating that the asynchronization problem caused by the current network delay is capable of being resolved through the advanced caching and the calculation in the next step is required;

calculating the time interval in which the media content is requested by the terminal to be sent in advance: wherein:

Earliest request time:

$$\text{Earliest\_Request\_Time} = \text{Available\_Time} - D_f \quad (2)$$

Latest request time:

$$\text{Latest\_Request\_Time} = \text{begin} - D_r D_f - \text{Data\_Transfer\_Time} \quad (3)$$

the actual request time is between these two times:

$$\text{Earliest\_Request\_Time} < \text{Actual\_Request\_Time} < \text{Latest\_Request\_Time} \quad (4)$$

selecting a request time, the time at which the terminal is capable of beginning to receive the data of the service provider is:

$$\text{Receive\_Time} = \text{Actual\_Request\_Time} + D_t + D_f \quad (5)$$

the time to receive the data before the time from the terminal to begin is:

$$At = \text{begin} - \text{Receive\_Time} \quad (6)$$

if Asset_Size attribute is given in CI, the size of the cache window assigned by the terminal is:

$$\text{Buffer\_Size} = \min\{At*\text{bitrate}, \text{Asset\_Size}\} \quad (7)$$

if Asset Size attribute is not given in CI, the size of the cache window assigned by the terminal is:

$$\text{Buffer\_Size} = At*\text{bitrate} \quad (8)$$

2. A resource dynamic request method under a heterogeneous media transmission network, comprising steps of: adding Available_Time of the media content in an MPT table, a CI file and an MPU signaling part for the existing signaling at a MMT, so that a client terminal gets the time when the corresponding media content is available; at the same time, determining the network bandwidth and the network uplink and downlink delay under the current network by the client terminal, and calculating the time interval for transmitting a request for caching in advance in the case of different servers through the available time of the content of a source and the delay by the client terminal;

according to the method, adding the available time information Available_Time of the assets in the reserved field of MMT_general_location_info( ) of the signaling MPT, and providing a method of calculating the Available_Time time window for a server which has different methods for processing the resource request message currently;

wherein for the method of calculating the Available_Time time window in practical application, there are two types of servers; when a resource request is received, if the resource on type A server is not ready, an error message is returned directly; if the resource on type B server is not ready, a message is not returned and the resource is sent after waiting for the resource to be ready;

for type A server, the client terminal dynamically requests the time window of the resource after the signaling is parsed to get the Available_Time of the media resource:

$$(\text{Earliset\_Request\_Time}, \text{Latest\_Request\_Time}) \quad (1)$$

Earliest request time Earliest_Request_Time:

$$\text{Earliest\_Request\_Time} = \text{Available\_Time} - D_f \quad (2)$$

Latest request time Latest_Request_Time:

$$\text{Latest\_Request\_Time} = \text{begin} - D_f - D_t - \text{Data\_Transfer\_Time} \quad (3)$$

the actual request time is between these two times:

$$\text{Earliest\_Request\_Time} < \text{Actual\_Request\_Time} < \text{Latest\_Request\_Time} \quad (4)$$

wherein $D_f$ is the uplink delay of the current media network, $D_t$ is the downlink delay of the current media network and Data_Transfer_Time is the time required for the server to send the media resource;

for type B server, a calculating method of the Available_Time by the client terminal comprising:

receiving the request message by the Type B server and sending the request message after waiting for the resource to be ready; sending a message requesting the resource by the client terminal when the signaling is parsed to get the existence of a resource, so for the client terminal of type B server:

$$\text{Earliest\_Request\_Time} = \text{Time when the client terminal parses the signaling to get the existence of a resource} \quad (5)$$

$$\text{Latest\_Request\_Time} = \text{Begin} - \text{Data\_Transfer\_Time} - D_t - D_f \quad (6)$$

3. The resource dynamic request method under the heterogeneous media transmission network according to claim 2, wherein the method of calculating the time window for the server to notify Available_Time signaling comprising:

under some media transmission networks, assuming that the time when the server gets the Avaliable_Time of a resource is $T_0$ and $T_0$ may be late, resulting in late time when the client terminal receives the relevant signaling after the sender sends the signaling; even if the client terminal calculates the correct request time window, the current time has been later than Latestest_Request_Time, so requesting resource still fails;

wherein in this case, the mechanism for the server to determine the signaling sending time is given as follows:

on the server, the time window for the client terminal to dynamically request the resource is calculated through the same method, and then the following judgments are made:

$$T_0 + D_t < \text{Latestest\_Request\_Time} \quad (7)$$

if equation (7) is not satisfied, it indicates that the Receiver can only get the Available_Time attribute in the signaling after Latest_Request_Time, so the resource cannot be requested in time; in this case, no relevant signaling is sent;

if equation (7) is satisfied, it indicates that the Receiver can get the Available_Time attribute in the signaling before Latest_Request_Time, so it can continue to get the time interval for sending the signaling as follows:

Calculation of latest notify time Latest_Notify_Time:

$$\text{Latest\_Notify\_Time} = \text{Latest\_Request\_Time} - D_t \quad (8)$$

the actual time of notifying the signaling Actual_Notify_Time is within the following interval:

$$T_0 < \text{Actual\_Notify\_Time} < \text{Latest\_Notify\_Time} \quad (9)$$

* * * * *